(12) United States Patent
Blanc-Paques et al.

(10) Patent No.: US 11,073,401 B1
(45) Date of Patent: Jul. 27, 2021

(54) ROAD NETWORK OPTIMIZATION BASED ON VEHICLE TELEMATICS INFORMATION

(71) Applicant: Skydio, Inc., Redwood, CA (US)

(72) Inventors: Fabien Blanc-Paques, San Francisco, CA (US); Mark Christian, San Anselmo, CA (US); Donald Curry Weigel, Los Altos, CA (US)

(73) Assignee: Skydio, Inc., Redwood City, CA (US)

( * ) Notice: Subject to any disclaimer, the term of this patent is extended or adjusted under 35 U.S.C. 154(b) by 65 days.

(21) Appl. No.: 15/917,397

(22) Filed: Mar. 9, 2018

Related U.S. Application Data

(60) Provisional application No. 62/470,078, filed on Mar. 10, 2017.

(51) Int. Cl.
| | |
|---|---|
| G01C 21/00 | (2006.01) |
| G01C 21/32 | (2006.01) |
| G01C 21/34 | (2006.01) |
| B64C 39/02 | (2006.01) |
| G06K 9/00 | (2006.01) |
| G08G 5/00 | (2006.01) |

(52) U.S. Cl.
CPC ........... *G01C 21/32* (2013.01); *B64C 39/024* (2013.01); *G01C 21/3461* (2013.01); *G06K 9/00651* (2013.01); *G08G 5/0034* (2013.01); *B64C 2201/123* (2013.01)

(58) Field of Classification Search
USPC ........................................................ 701/450
See application file for complete search history.

(56) References Cited

U.S. PATENT DOCUMENTS

| | | | |
|---|---|---|---|
| 2016/0171278 A1* | 6/2016 | Ponder | G06K 9/00651 382/104 |
| 2017/0053155 A1* | 2/2017 | Campbell | G06K 9/0063 |
| 2019/0130182 A1* | 5/2019 | Zang | G06K 9/00651 |

OTHER PUBLICATIONS

Boyko, Aleksey; Funkhouser, Thomas. "Extracting roads from dense point clouds in large scale urban environment." ISPRS Journal of Photogrammetry and Remote Sensing, Sep. 13, 2011.
Douglas, Robert A.; Lawrence, Karl, "Optimizing haul road design—a challenge for resource development in Northern Canada." Low-Volume Road Construction Session of the 2014 Conference of the Transportation Association of Canada.
Jengo, Christopher M.; Hughes, David; LaVeigne, Joseph D.; Curtis, Ivan. "Pothole Detection and Road Condition Assessment Using Hyperspectral Imagery". ASPRS 2005 Annual Conference.

(Continued)

*Primary Examiner* — James M McPherson
(74) *Attorney, Agent, or Firm* — Young Basile Hanlon & MacFarlane, P.C.

(57) ABSTRACT

Methods, systems and apparatus, including computer programs encoded on computer storage media for determining asset efficiency. Unmanned Aerial Vehicles (UAVs) may be used to obtain aerial images of locations, property or structures. The aerial images may be geo-rectified, and a orthomosaic, digital surface model, or a point cloud may be created. In the context of an operation where mobile assets are used, such as construction or earth moving equipment, location-based event information may be obtained. The location-based event information may be used to determine road segment conditions or road topology where problematic road conditions likely exist.

27 Claims, 5 Drawing Sheets

(56) References Cited

OTHER PUBLICATIONS

Lin, Yucong; Saripalli, Saripalli, Srikanth. "Road detection from Aerial Imagery". 2012 IEEE International Conference on Robotics and Automation, RiverCentre, Saint Paul, Minnesota, USA May 14-18, 2012.

Nguyen, Anh; Tuan, Gia. "Overview of Three-Dimensional GIS Data Models". International Journal of Future Computer and Communication, vol. 2, No. 3, Jun. 2013.

Tannant, Dwayne D.; Regensburg, Bruce; "Guidelines for Mine Haul Road Design." School of Mining and Petroleum Engineering Department of Civil and Environmental Engineering University of Alberta, 2001.

Thompson, R.J.; Visser, A.T.; Miller, R.E; and Lowe, N.T. "The development of a real-time mine road maintenance management system using haul truck and road vibration signature analysis." The South African Institute of Mining and Metallurgy, 2003.

Zhang, Chunsun. "An UAV-Based Photogrammetric Mapping System for Road Condition Assessment." The International Archives of the Photogrammetry Remote Sensing and Spatial Information Sciences. vol. XXXVII. Part B5. Beijing 2008.

Zhang, Chunsun. "Monitoring the condition of unpaved roads with remote sensing and other technology." Final Report for US DOT ETPH56-06-BAA-002.

* cited by examiner

ROAD NETWORK OPTIMIZATION BASED ON VEHICLE TELEMATICS INFORMATION

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned Aerial Vehicles (UAVs) may be used to obtain aerial images or LIDAR data of locations, property, structures, quarries, mining areas, and roads. The aerial images may be geo-rectified, and orthomosaic imagery, digital surface models, and/or point clouds may be created. The LIDAR data may likewise be used to generate a 3-dimensional model of scanned objects, and ground topology. In the context of operations where vehicles are used to move earth and minerals, such as in mining operations, and/or quarrying operations, the vehicles maneuver along a road network of haul roads. The existing road conditions of the road network have a significant impact on the overall efficiency of vehicle operations.

SUMMARY

Particular embodiments of the subject matter described in this specification can be implemented so as to realize one or more of the following advantages. The systems and methods herein provide advantages to improve and automate road network optimization by leveraging high resolution on demand aerial imagery/road network geometry with vehicle telematics information.

In general, one innovative aspect of the subject matter described in this specification can be embodied in a system, computer readable media and methods that include obtaining aerial images of a location, wherein the aerial images are geo-rectified. A road network is generated based on the aerial images. The road network is divided into multiple segments. Vehicle traversal criteria is established for each of the one or more road segments. In one embodiment, vehicle traversal criteria includes one or more of a predetermined traversal speed of the road segment, a predetermined traversal time for the road segment, or a predetermined fuel consumption amount for the road segment. Historical event information is obtained by the system for multiple vehicles that have traversed the road segments. The vehicles during their operation collect operational data that includes geospatial positions, time, and event data for a respective vehicle. The system determines whether the vehicles have traversed the road segments, and meet or fail to meet the determined vehicle traversal criteria for one or more road segments. A user interface presents the one or more road segments with indications that the particular road segment has vehicles traversing the segment at values different than the established traversal criteria.

In a further innovative aspect, the system may generate a flight plan for a UAV to survey the particular segment, or a particular road condition, and obtain further aerial images of a particular segment. The aerial images may be analyzed to identify problems with the segment such as wash boarding, pot holes, standing water, rutting of the road, etc. These particular road conditions may be represented via the user interface over the road segments where the particular road condition exists.

In a further innovative aspect, the system may generate instructions, commands and/or geofences and transmit them to specific vehicles that traverse the road network, or operate in a geospatial area. The vehicles are configured to receiving the instructions, commands and/or geofences and then obtain sensor data from onboard vehicles sensors, such as LIDAR, digital cameras (such as visible/RGB, multi-spectral, short wave IR, medium wave IR, long wave IR), RADAR devices (such as SAR), or SONAR devices. The vehicles while traversing a particular area will activate the onboard sensors and obtain data describing the physical road on which the vehicle maneuvers. The system then receives this sensor data, and updates, or augments the road network as described herein.

In a further innovative aspect, the system may travel paths for a vehicle to travel along, or areas of a road network so that the vehicle would avoid a determined hazardous, or inefficiency causing road condition.

In another innovative aspect of the subject matter described in this specification there is a system, computer media and method for determining geographic structures using a digital surface model generated from aerial images by an unmanned aerial vehicles, and determining that certain objects or surface structures, such as roads, lanes, mounds, hills, embankments, trees, buildings, etc. are causing inefficient traversal operations of vehicles by evaluating location-based event data of mobile assets to the 3-dimensional digital surface model.

Detection and reporting of segments of a location traversed by mobile assets in a less than optimal manner allow savings on consumables and energy (vehicles operating at their optimal efficiency saves fuel, driving on smooth roads increase life of tires) and improving productivity (trucks move faster across a site). For example, increasing the speed of a vehicle on a road segment may lead to a significant savings for consumables such as fuel, and tires.

DETAILED DESCRIPTION

This specification describes a method and system for determining road network optimization for vehicles operating in the road network. Unmanned Aerial Vehicles (UAVs) may be used to obtain aerial images or Light Detection and Ranging (LIDAR) data of locations, property, structures, quarries, mining areas, and roads. The aerial images may be geo-rectified, and orthomosaics, digital surface models, or a point clouds may be created. In the context of an operation where mobile assets are used, such as construction or earth moving equipment, location-based event information may be obtained. A system (e.g., a system of one or more computers, a system of one or more processors such as a user device) determine haul road optimization, and road conditions that may impede efficient operation of the mobile assets.

Road Condition Terminology. The following describes how certain terminology is used to describe the method and system.

Physical road state—a physical road state is a real world physical condition, or state of a portion of a road, ground or surface. This is the state of how the road actually and physically exists. UAV sensors and vehicle sensors, such as LIDAR sensors or digital cameras, would obtain a description or a scan of the physical road state. The LIDAR sensor would scan the physical portion of a road, ground or surface, so that the system may generate point clouds representing the physical state of the ground topology. Digital images can be obtained depicting an aerial view of the road, ground or surface. The digital images may be associated with geo-spatial locations of where an image was obtained. Photogrammetry processing techniques may be used to create digital surface models, ortho-rectified imagery, and point clouds from the images that describe the physical state of the ground topology. The physical road state changes over time due to naturally occurring phenomena, such as weather, or man-made phenomena, such as vehicles traversing over the physical roads. The obtained sensor data describes the physical road state as of a particular place and time.

Road condition model—a road condition model is digital representation of a physical road state. The road condition model is a 3-dimensional or 2-dimensional model representing the physical road state. The road condition model may be represented by vector data, point cloud data, polygon data, or any other data representing the topographical structure of the physical road state. The system uses the road condition model to analyze the physical structure, topology and geometry of the ground. The system may use the road condition model to analyze find details of the road condition, like potholes, washboarding etc. For example, the road condition model could be represented as a digital surface/terrain model, a point cloud, TIN (triangulated model), BREP model, such as 3DFDS (format data structure), TEN (tetrahedral network), SSM (simplified spatial model), OO (object oriented model), SOMAS (solid object management system), UDM (urban data model) OO 3D (object oriented 3D), City GML. The road condition model could be represented by a Voxel model, such as a 3D Array, or Octree. The model could be a CSG, or combination such as V-3D, or B-Rep+CSG.

Road condition image—a road condition image is a view or depiction of a physical road state as depicted in a digital image. The digital image may have an associated geo-spatial location of where the image was obtained. The digital image also includes meta-data regarding aspects of the image. The metadata includes relevant details about the image, and how the image was captured. For example, an image may include information about the use of specific lens aperture, focal length, camera shutter speed, ISO sensitivity, whether flash was used or not, the time, location of the image, angular position (roll, pitch, yaw) as well as heading. A road condition image may be displayed, via a user interface, report or digital map, in whole, or part, along with the road network to show a real world depiction of the physical road state. They system may detect road condition anomalies from imagery (visible/multispectral, and thermal) that would identify water, ice, snow, etc. For example, multispectral images or thermal images may be analyzed to identify water, ice or snow on the ground or road.

Road condition graphic—a road condition graphic is an icon, or graphical representation or element used by the system to represent a road condition model, a physical road state, or a suspected road condition. The road condition graphic may be displayed in a user interface over a road or a road network. The road condition graphic may be included in reports, and digital maps. The road condition graphic when displayed in a user interface may be selectable and capable of receiving a user input, and allow interaction with the road condition graphic. If receiving a selection or an input on the road condition graphic, the system may obtain and display information representing the underlying particular road condition model, physical road state, suspected road condition, type of road composition, scoring or ranking of the aforementioned items.

Road condition location—a road condition location is a geo-spatial location of the physical road state, the road condition model, or a suspected road condition. The location may be a specific geo-spatial location such as a latitude/longitude coordinate, a collection of latitude/longitude coordinates, a defined geo-graphic area, a geospatial boundary, a geofence, or be based on other location coordinate grids (such as Cartesian coordinate grid, spherical coordinate system, ellipsoid-based system, WGS84 coordinate system). The location may be an absolute location, or a relative location as a displacement from another location.

Suspected road condition—is a location or an area of a road where there is a portion of the road that the system identifies as being a suspected, likely, or probable area where a condition of the road exists causing a vehicle to maneuver about the area in an inefficient manner, or not in accordance with a pre-determined operational value, such as a minimum vehicle speed for the road. The system by analyzing vehicle event history data may identify a likely geographic area of a physical road where the system determines that a physical road state may be causing maneuvering inefficiencies. For example, the system may identify that a group of vehicles is slowing down in a particular geographic area. The system may extrapolate that this particular geographic area has a physical road state causing the vehicles to slow down to traverse the physical road state in a safe manner.

Figure 1:
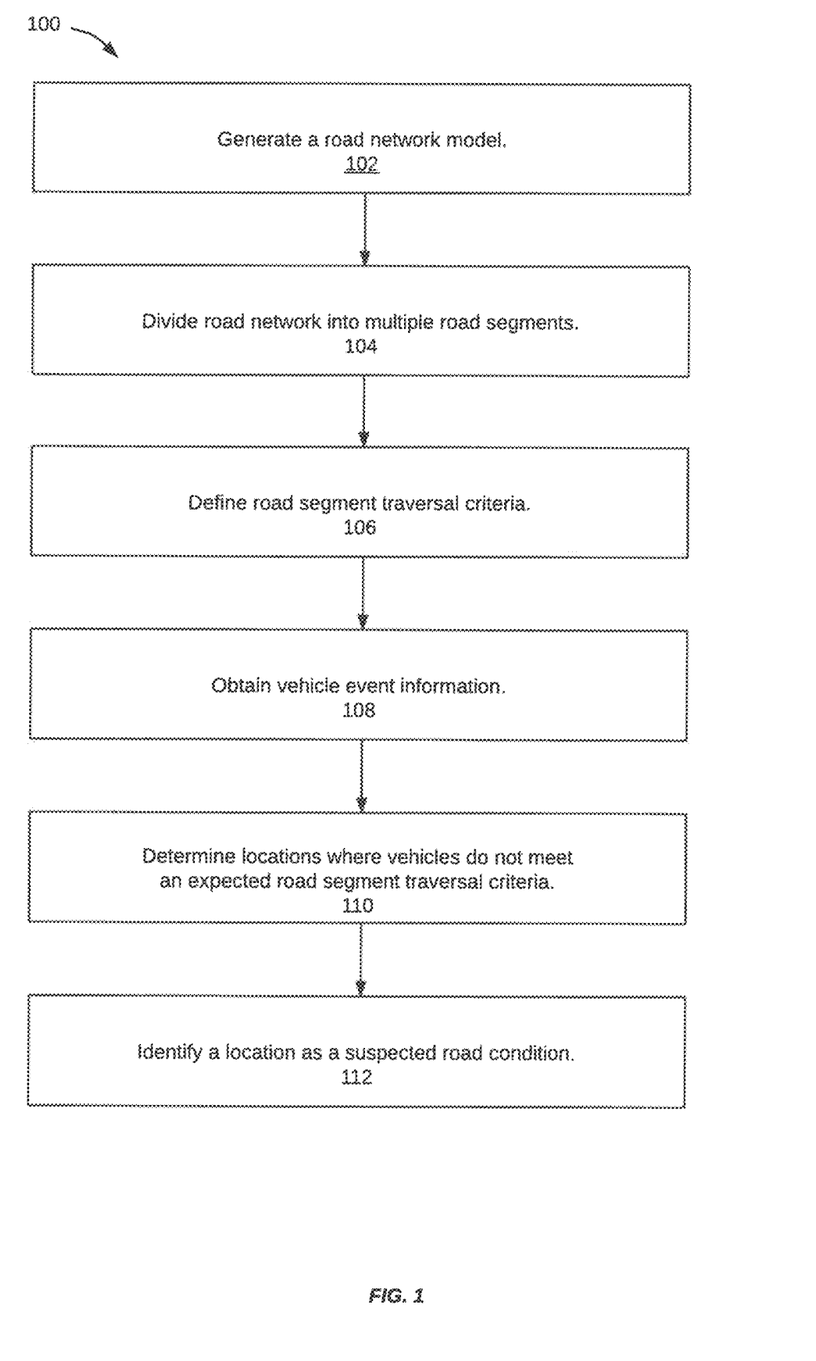
FIG. 1 illustrates a flow chart describing an exemplary process of the system.

Referring to FIG. 1, a representative description of the process 100 and system is described.

Generating a Road Network Model. In step 102, the system generates a road network model. A road network model may be generated from obtained 3-dimensional models, point cloud data, and/or geo-rectified imagery, or a combination of the foregoing. A composite model may be generated from 3D and raster data, and raster data could be a composite from n-bands.) The road network may be generated by various techniques known in the art. The road network is a system of interconnecting lines and points representing the system of roads for a particular area. A 3-dimensional road network may be created using the sensor data acquired from the mobile assets, and/or from the UAV. The road network may be a pre-existing road network model. Points of the road network may have location information such as latitude, longitude and altitude values. The road network model may be stored in a database or storage medium. As discussed below, the road network model may be presented via a user interface and show the overall road network and road segments. The road network may be superimposed on the imagery of the area of which the road network exists. The boundaries of the roads in the network may be displayed in various colors, and graphical line dimensions to represent different aspects of a particular road of the road network. For example, a road of the road network may be displayed with different colors or line thickness to represent a type or use of the road, for example a haul road, or a service road.

An Unmanned Aerial Vehicle (UAV) may perform an inspection of a site that has roads for vehicle use, the inspection to be performed on a periodic basis for example, daily. The UAV may obtain aerial imagery, and/or LIDAR data from a LIDAR scanner describing the physical road state of the roads existing at the site. The aerial imagery is processed using photogrammetry techniques to create geo-rectified imagery, point clouds, digital surface models, 3D models of the area scanned. This obtained imagery or LIDAR data may be used to create the road network model.

Moreover, mobile assets may be equipped with sensor devices that can capture real world information. As a vehicle traverses a road network the vehicles may collect LIDAR data measuring the road physical surface. The LIDAR data describing the physical road state is submitted to and received by the system. The LIDAR data provides an accurate up-to-date description of the road surface and may be used to create very specific 3-dimensional models of the road, for example a point cloud of the road using the 3-dimensional point data obtained by a LIDAR laser scanner.

The generated road network model has a certain road geometry with attributes at particular points of the 3D model. For example, the road has elevation values, grade or slope of the road a particular point, the width of the road at particular location, a centerline of the road, berms, medians, road edges, and barriers. The road network may have curve values. The road geometry for a particular road segment may be defined by one or more parameters including: cross-falls, center line, super elevation, road width, grade, radius, switch backs, 2-ways, n-ways, or rimpull curves. The road network may be displayed via a user interface, or on a report, or with a digital map, and may be represented, with imagery of the physical road, graphical representation of the roads, or by models represented the roads.

Divide Road Network into Multiple Road Segments. In step 104, the system determines segments into which the road network should be divided. These road segments may be based on a change in slope, based on a particular distance of the road, or may be user defined where the system, via a user interface, receives input to select locations of the road network where the road should be divided. For example, the system may evaluate a change of slope along a road, and based on a threshold slope change the system may divide the road at the slope change. The system may also divide roads based on a predetermined distance, such as every 1000 meters. Additionally, as discussed below, the system may determine the composition of the road, such as paved, concrete, asphalt, gravel, mud, dirt, etc. Based on the determined composition of the road, the system may segment the type of road based on the road type. The road segments may be displayed and graphically represented via a user interface, on a report, or with a digital map.

Road Segment Types. The system may categorize the different road segments into different types of road segments. For example, a road segment may be classified as to the particular type of use, or the type, size, weight of vehicles allowed or permitted to use a particular road segment. By comparing the obtained telematics for vehicles traveling along a road segment, the system may determine if a type of vehicle has traveled along a particular road segment where it should not have. The particular type of road segment may be associated with a segment traversal criteria as described below. Different types of road segments may have different segment traversal criteria. Also, different vehicles types or categories may have different segment traversal criteria.

Define Segment Traversal Criteria. In step 106, an expected segment traversal criteria is designated for the road segments. As indicated above, the road network may be divided into multiple road segments. The road segments may have a defined operational criteria that a vehicle should achieve while traversing the road segment. The criteria may be based on the type of vehicle, the model of vehicle, for a specific vehicle, whether or not the vehicle is loaded, and/or for a particular weight of the vehicle. The foregoing is meant to be illustrative, and not limiting as to the particular requirements for the segment traversal criteria. Vehicle event history for those vehicles traversing the road segments may be analyzed by the system and the geo-graphic location of event data may be compared for a road segment to determine if a vehicle, or multiple vehicles, has achieved, or not, the desired segment traversal criteria.

If for example, multiple vehicles are not achieving the desired road segment traversal criterial, then this would indicate the likely existence of a suspected road condition causing inefficient operations of the vehicle. The vehicle may be consuming additional fuel, or wearing tires unnecessarily due to an actual physical road state, for example wash boarding. By evaluating vehicle telematics data, the location or area along the road segment can be identified with a geo-spatial boundary of where the problem (the suspected road condition) may exist along a road segment. For example, the vehicle telematics data may indicate that at a particular location, vehicles are slowing below a threshold value of an expected or optimal speed for the road segment. This may be indicative that a physical road state exists, such as wash boarding, ruts, or large pot holes, mud, uneven terrain, ice, snow, water, etc.

Identifying these suspected road conditions by the system and reporting the road segments of a site being traversed by vehicles at sub-optimal criteria, such as lower speeds, would help site managers, and companies, generate savings on consumables and energy (trucks running at their optimal efficiency saves fuel, driving on smooth roads increase life of tires) and improving productivity (trucks move faster across a site). Example: Increasing the speed of X miles/hr on this segment leads to $Y on fuel savings and $Z on tires savings yearly.

Operational criteria can be calculated as current performance indexes by combining multiple parameters such as truck speeds/accelerations at different points of the segment, road geometry, road condition, truck position, truck type, truck load, and fuel consumption. The system may compare current performance indexes with optimized indexes for all road segments of the site. Each of the vehicles may from its respective historical event data, be assigned a performance index. For example, a dump truck traversing a road segment over a period of a few days, may be traveling along the road segment at 5 mph on day one, 7 mph on day 2 and 6 mph on day 3. The speed value of the dump truck may be indexed to a value of 6 based on the average speed for a determined time period. The road segment may be assigned an optimized index of 10 mph. By comparing the index of the vehicle to the assigned optimized index for the road segment, the system may determine that the road segment, or portions of the road segment, have areas where the vehicle is not operating at the desired speed. By analyzing the event history for multiple vehicles, for the same time period, the system may determine that for a particular area of a road segment, there is an overall slow down of vehicles, thus suggesting a suspected road condition. This determination indicates that the particular area of the road segment is likely problematic. As discussed below, the road segment may be displayed in a user interface, a digital map, or user report. Additionally, as discussed below, a flight pattern for the particular area identified as problematic may be generated, and provided to a ground control system for inspection of the road segment where the problem area was identified.

Obtain Vehicle Event Information. In step 108, the system obtains information about mobile asset operations. The assets, such as vehicles, generate telematics data including events having an associated geo-spatial position and time values. The event data may be collected directly from onboard vehicle sensors and transmitted to the system for storage in a database or other storage repository. Optionally, the event data may be collected by another system and then provided to the system described herein. The vehicles may store the telematics data over a period of time, and submit the data to the system for analysis.

The system receives the telematics data from the multiple vehicles. In some embodiments, the vehicle operation information includes at least a state of the vehicle at a particular time and a particular location. The state of a vehicle may be represented as an event type for the vehicle. The vehicle operation information may also include unique identification numbers or values for each of the respective vehicles.

Mobile assets, such as earth moving equipment, will perform operations about a site and will use and travel along the roads of the road network. The vehicles will traverse the road and maneuver over the physical road state. The physical road state may dictate how a vehicle traverses the road. During operations, the vehicles continuously collect operational data. Vehicle data may be delivered through telematics (historical data or real time data) through such systems as VisionLink, VIMS, AEM/AEMP and can include vehicle position, speed, acceleration, shock absorber data—rate and intensity of compression—fuel consumption, idling, gear shift, brakes, load, RPMs.

Table 1 illustrates an exemplary database (e.g., database table) usable for determining event information of a mobile asset, such as earth moving equipment or other construction equipment.

TABLE 1

| Asset ID | State | Event | Duration | Date/Time | Value | Location |
|---|---|---|---|---|---|---|
| VEH123 | Empty | Idling | 360 seconds | Feb. 1, 2016 12:02:10 | 0 | Latitude/Longitude |
| VEH123 | Empty | Moving | 750 seconds | Feb. 1, 2016 12:08:10 | 5 | Latitude/Longitude |
| VEH124 | Empty | Idling | 1200 seconds | Feb. 1, 2016 12:02:15 | 0 | Latitude/Longitude |
| VEH124 | Empty | Moving | 650 seconds | Feb. 1, 2016 12:22:15 | 6 | Latitude/Longitude |
| VEH125 | Loaded | Idling | 420 seconds | Feb. 1, 2016 14:35:20 | 0 | Latitude/Longitude |
| VEH125 | Loaded | Moving | 540 seconds | Feb. 1, 2016 12:42:20 | 10 | Latitude/Longitude |

Asset information is identified based on a unique identifier for the asset, such as an Asset ID (i.e., vehicle identifier). The identifier allows tracking of information for specific mobile assets. An event type is also captured, along with time information, such as a date and a time the event occurred, and duration of the event, and one or more geospatial locations of where the event occurred. Other tables may be used to look up the type of asset based on the unique vehicle identifier. For example, VEH123 may be associated with an asset type of dump truck. Table 1 includes data for Asset ID (a unique identifier for a vehicle), State (a particular operational of the vehicle), Event (a particular action of the vehicle), Duration (the duration in time of the action of the vehicle), Date/Time (is a date and time value when the particular action of the vehicle occurred), Value (is a value related to the event, in the example table the values represent the speed of the vehicle in miles per hour. As shown, for and Idling event, where the vehicle is stopped the speed is 0. Where the Event is moving, the respective speed of the vehicle is shown). The table is a manner in which the event data may be described. It is not meant to limit the particular manner in which the data is stored, and the data may be stored in various data formats or database, and/or formats.

During the course of operations about the road network, multiple events may be generated for a vehicle. The vehicles may generate the events via onboard computer systems of the vehicle. This event data is received by the system, in detailed or summarized form, for event collection and analysis. Other event types may also be captured, for example, moving, operating, lifting, turning climbing, descending, loading, unloading, transporting, engine off, emission amount, braking, accelerating, decelerating, wheel slippage, gear changes, etc. This list is not meant to be exhaustive, but meant for illustrative purposes.

The vehicles may have tire pressure monitoring systems (also known as TPMS). Real-time tire pressure and tire temperature data may be obtained by the vehicles. Poor road surfaces affect the pressure and tire temperature. The event history data may be analyzed to determine road segments where higher tire pressures and/or temperatures are occurring along a road segment. The actual position of the higher temperature may be time-indexed, in that tires take a period of time to increase in pressure and/or temperature. The areas identified as causing higher temperature and/or tire pressures would suggest that a particular road segment may have suspected road conditions that are not ideal for operations of the vehicles along the road segment.

The system may detect events that could potentially deteriorate and/or create a hazard on a section of a road, thereby leading to sub-optimal traversal times for vehicles traversing along the road section. The system may determine that events like a truck slipping (brakes activated and truck moving). A vehicle experiencing events such as this would likely deteriorate the road either with a single event, or recurrent events (e.g., multiple trucks are slipping, eroding the road on a specific location). Vehicles with large tires may dig into the earth and cause displacement, or erosion of where the tires are slipping. The system may determine that over a period of time, multiple trucks have been operating in a particular location, and that certain ground deterioration events have occurred. The system may then identify the location as a suspected road condition.

Identify Road Segments Where Vehicles Do Not Meet the Expected Segment Traversal Criteria. The system may detect that a vehicle is operating in an inefficient manner along the road network. They system may analyze telematics data from one or more vehicles and identify that inefficient operations are occurring at a particular area or location along the road network. The vehicles have systems that monitor location, movements, status and behavior of the vehicle. For example, the system may receive event history information from the vehicles (i.e., telematics data), and identify that over a period of time, that multiple vehicles are braking hard, or slowing down, or moving slowly in an area of the road network that otherwise should be traversable at a faster speed.

In step 110, the system determines the road segments where vehicles are not meeting an expected segment traversal criteria for the road segment. The system obtains event history data from the vehicles that traverse the road network. The system analyzes the event history data from the vehicles and identifies based on the geo-spatial location of the events at what location the particular events have occurred. The locations of the events are correlated or geo-rectified to the road network. By evaluating the type of vehicle event, and the locations of the events, the system may determine that a particular location along a road segment may be causing the vehicles to perform in an inefficient manner, and thereby determine that a suspected road condition exists at or near the location of the events.

In step 112, the system may predict or identify that the road may have certain road conditions that are problematic and that vehicles traversing the road segment are not performing at optimal conditions. For example, the event data may show that multiple vehicles are moving at a slow speed, or a speed slower than a pre-determined segment vehicle speed, or that vehicles are braking, decelerating along a road segment where these particular events should not otherwise occur, or be limited in their duration. These events may be indicative of a problematic road conditions, and the area where the events occurred can be determined by the system to be a suspected road condition. The system may count or weight the number of these events occur to determine a probability that the road actually has a suspected road condition. If the number of measured events from multiple different vehicles indicate the same failure to meet the traversal criteria, then the certainty of a problematic road condition may be confirmed. The system may then identify the area where the events occur as a possible or suspected road condition. The location or area of the suspected road condition may be used for a number of purposes by the system, such as UAV flight planning as described below, updating the road network with areas as suspected road conditions, generating reports identifying the suspected road conditions, dispatching instructions to vehicles to obtain sensor data describing a physical road state of the area, displaying via a user interface graphical road conditions representing the suspected road condition, generating digital maps with representations of the suspected road condition, and/or generating reports for areas where the suspected road condition is determined to exist.

Image or LIDAR-based Road Condition Identification. In addition to the creation of the road network, the system may supplement the road network with additional information representing various road conditions. The system may determine the actual physical road state of a road using aerial imagery or LIDAR data obtained by a UAV. Also, vehicles traveling along the road network may be equipped with LIDAR sensors and obtain LIDAR data describing the physical road state. The obtained imagery and LIDAR data is provided to the system. For example, using the LIDAR data or the imagery obtained, the system may identify the existence of physical road states such as pot holes, water coverage, snow coverage, wash boarding, ruts in a road, etc. Then a representation of the actual physical road state may then be associated with the road network as road condition model, such as a 3-dimensional structure, or a 2-dimensional area. The road condition model may comprise a spatial area, and may be stored in a database, or other storage medium, as 3-dimensional or 2-dimensional data. The system associates the point cloud of the LIDAR data with the road network. The LIDAR data is georeferenced with the locations of where the LIDAR data was obtained by the UAV or the vehicle. A point cloud is a set of data points in some coordinate system. In a 3-dimensional coordinate system, typically the points area defined by X, Y, and Z coordinates, and are points of the external surface of an object, such as the surface of a road.

In particular, with point cloud data, the system can determine anomalies in the road. For example, the system may detect surface dimension changes, or other non-uniformity of the road, of a certain threshold to identify pot holes, wash boarding, or raised areas of the road. The particular detected area may then be associated with the road network at the geo-spatial location of the identified anomaly.

Severity of Road Condition. The system may evaluate the seriousness or degree of the road condition by analyzing road condition images, or system generated road condition models. The road conditions of the road condition images, the road condition models, and/or the suspected road conditions, may be assigned a value, rating, or ranking based on the seriousness or degree of severity of the road condition. For example, the system may identify that multiple pot holes exist along the road. The system may determine that a small pot hole with a width of 3 inches may be given a rating of 10 on a scale of 1 to 10 where 1 is the most severe, and 10 is the least severe. However, a pot hole with a width of 20 inches may be given a rating of 3 on the scale. The particular value, rating, or ranking may be tuned, for example, based on physical aspects of the road condition, such as the height, depth, width of the road condition, or surface area of the road condition.

A rank or score may be assigned to each of the road conditions to the road condition images, the road condition models, and/or the suspected road conditions. For example, based on the dimensions of the road condition, or the impact that the type of road condition may have on a vehicle. It is possible that a road segment has multiple problematic road conditions. For example, a road segment may have a number of pot holes, rutted lanes or standing water, etc. Each of these problematic road conditions may be scored, and road segments may be ranked based on the aggregate scores of the road conditions contained within a particular road segment. Additionally, the user interface, digital maps described herein, may display one or more of the road conditions on the road segment with an indicator of the severity of the road condition, such as a particular numeric values, ranking value, severity value, color, markings or certain shapes shapes.

Composition of Road Condition. In certain instances, a road condition image, road condition model, a suspected road condition, or a road condition graphic may be identified as having water, snow, that the road is muddy, or is made of a particular material. Thermal images or other sensor data may be obtained by the UAV, or the mobile assets. The information may then be processed to identify the existence of the composition of the road condition. Composition of the road condition may be defined by the road conditions aspect (rough/smooth), presence of water puddles, water, snow, ice, etc. The composition of the road at particular locations is associated with the road network model.

Image Classification. Optionally, the system is in communication with a classifier information database (e.g., one or more databases, or a storage subsystem) that can store information describing one or more visual classifiers (e.g., information utilized by one or more machine learning models, such as support vector machines, k-means clustering, neural networks, and so on). A reviewing user can review the road condition images, and correctly classify the types of road conditions identified in the sensor data. This correctly classified information can be used to update the one or more visual classifiers.

The system obtains datasets of road condition images that include sensor information describing the physical road state. The datasets can be obtained over a sufficient period of time to gather a large enough dataset to train a classifier. The datasets can include sensor information describing the road conditions. The datasets can further include sensor information describing the road conditions of a road segment over a period of time.

The datasets can be labeled according to specific road condition, for instance, a reviewing user can identify that a particular image illustrates pot holes or ruts in the road, and the identification can be included as metadata with the obtained datasets. Optionally, the datasets can be unlabeled, and can include sensor data of the road conditions.

The system trains a visual classifier using the obtained dataset. The system can use supervised, or unsupervised, training techniques to train the visual classifier. As will be described, the trained visual classifier will be used road conditions from aerial images.

As an example, the system can utilize a support vector machine (SVM) to train the visual classifier. The system can obtain labeled datasets (e.g., the datasets can indicate whether the road has a road condition), and the system can generate models describing features that characterize the sensor information as including the road condition. Additionally, the system can generate models using before and after sensor information obtained describing the same area of road. For instance, the system can determine a difference between the images (e.g., the system can process a before and after image to be oriented from a same perspective, correct for exposure, depth of field, lens effects, and can determine a difference in the images). The difference can be used when discriminating between features that inform the road condition.

Furthermore, the system can utilize features that are known to be indicative of particular type of road conditions (e.g., a feature vector), and the visual classifier can determine whether the features exist in received sensor information. For instance, the system can train the SVM to recognize the features, and determine respective weightings of each feature to best characterize sensor information as being indicative of a particular type of road condition.

As another example, the system can utilize unsupervised training techniques, such as neural network modeling, k-means clustering, and so on. The system can use unsupervised training techniques to determine distinct categories in the obtained datasets, and each category can be labeled by a user (e.g., a reviewing user), or the system can assign likely levels of damage for each category. Additionally, the unsupervised training technique can utilize particular features indicative of type of road conditions to determine distinct categories in the road condition image datasets. Thereafter, to determine levels of severity of a road condition for each category, the system can assign higher levels of certainty of road conditions that correspond to greater inclusions of the particular features.

A non-exhaustive list of features or road conditions that may be trained and later automatically identified by the system includes, pot holes, wash boarding, ruts, ditches, alligator cracking, block cracking, transverse cracking, edge cracks, joint reflection cracks, slippage cracks, depressions, shoving, upheaval, raveling, water pooling, snow, large rocks, obstacles, erosion, plant or foliage overgrowth, uneven surfaces, or protrusions.

The system can obtain sensor information that has been obtained during an inspection of a road segment by the UAV, and the system can incorporate the obtained sensor information in improving the accuracy of the visual classifier. For instance a reviewing user, can receive information describing whether obtained images of an area a road are indicative of a particular type of road condition or of a road composition (e.g., labeled by the visual classifier). The operator, or other reviewing user, can indicate that the label is correct or incorrect. The system can utilize the updated labeled information to provide corrections to the visual classifier (e.g., as a feedback loop).

The system updates the visual classifier. As described above, the system can determine updates to the visual classifier. The updated visual classifier can be stored for use by UAVs, user devices, or by the system, or by the mobile assets.

Automated Flight Path Creation for Particular Road Segments

Figure 2:
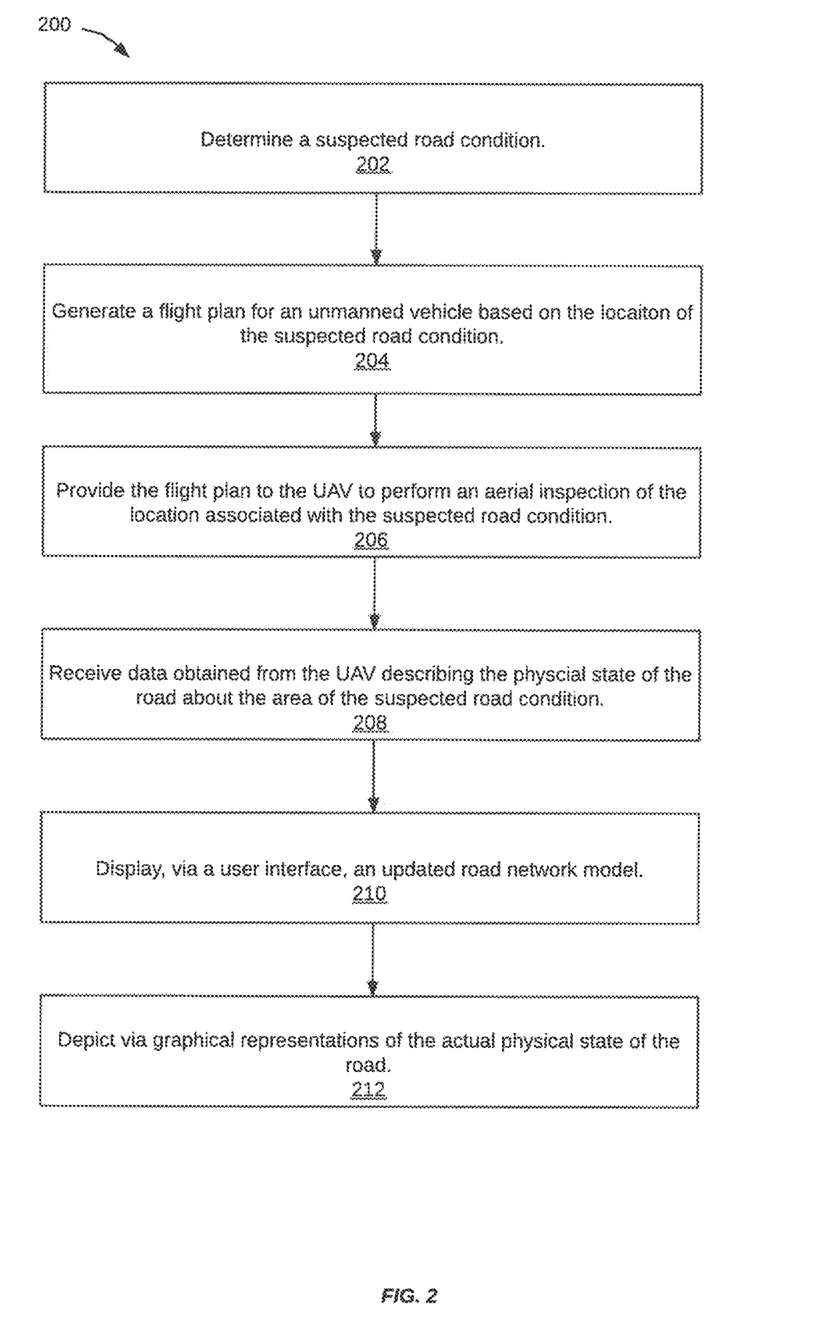
FIG. 2 illustrates a flow chart describing an exemplary process of the system.

Referring to FIG. 2, a process 200 of the system is depicted. In step 202, the system determines a suspected road condition. In step 204, the system generations a flight plan for an unmanned aerial vehicle based on the location of the suspected road condition. In step 206, the system provides the flight plan to the UAV or to a ground control station configured to control the UAV. In step 208, after the UAV conducts the flight plan and obtains sensor data describing the actual physical state of the road, the system receives the sensor data obtained by the UAV. In step 210, the system displays, via a user interface, an updated road network model based on the processed sensor data. In step, 212, the system displays graphical representations of the actual physical state of the road.

A flight plan can be generated by the system to inspect an area where the inefficient operations of the vehicles are occurring, such as for suspected road conditions. The UAV may receive the flight plan, and automatically inspect the location of the suspected road conditions where the inefficient operations have been occurring. The UAV may then obtain sensor data of the area, for example detailed aerial images or LIDAR data. The obtained sensor data my then be further processed by the system to identify and confirm that any physical road states actually exist, and are causing the vehicle maneuvering inefficiencies. The system after processing the data obtained by the UAV, may determine that a physical road state exists such a rut or pothole may be determined to exist at the inspection area.

The system may generate a flight plan for a UAV to obtain aerial information for a particular road segment based on a determined, known or suspected road condition. The UAV receives flight information describing a job to be performed. The UAV receives (e.g., from a user device, or from the system) information describing a job to inspect a road segment, or a particular area associated with a suspected or known road condition. The system provides information describing the job to a UAV and/or a user device such as a ground control station in communication with the UAV. The system can provide information describing the job to the UAV (e.g., the selected UAV described above), and the UAV can be taken by an operator to an area near the suspected road condition to launch the UAV. Also, the job information can be provided to a user device of the operator, and the operator can modify information, and provide the modified information to the UAV. The flight plan may use the one or more road segments as an inspection area. The geo-graphic boundaries of the road segment may be used for an inspection area. A flight pattern for the UAV is created based on the road segment, where the UAV for example, flies a radiator pattern back and forth along the road segment, and obtains aerial imagery of the road segment. The obtained sensor data is then sent to the system, either by a ground control station (GCS) or directly from the UAV. The images are analyzed as described herein to identify particular road conditions, and may be used to supplement the base imagery of the location of the road network.

Additionally, a flight plan may be generated for the UAV where the UAV travels to each location of identified, suspected, or existing road conditions that need to be inspected. The UAV will follow a path from a particular road conditions to another road condition, traveling at a predetermined altitude. The UAV altitude will stop at a particular road condition, for example a pot hole, and then vertically descend over the road condition, and obtain detail sensor data describing the road condition. The UAV will then ascend and then travel to the next road condition, and then descend and obtain sensor data describing the road condition. The geo-spatial coordinates of the road condition are used to identify a waypoint for the UAV to travel to. The system may generate automated flight plans for the UAV to inspect the road conditions, and particular road segments.

The user device receives the job information. As described above, the system can determine job information (e.g., from information received from a user of the system), and can provide the job information to the user device. The flight pattern can be associated with real-world coordinates (e.g., GPS coordinates) for the UAV to follow.

The flight pattern can include waypoints that describe the determined flight pattern. For instance, the waypoints can indicate lengths along the first axis, and a distance from the first axis to the second axis (e.g., distance of each leg, and distance between legs, as described above). Optionally, the UAV can execute an application (e.g., a user application) that can receive the waypoints, and utilize the waypoints to effect the flight pattern. That is, the user device, or system, can package the flight pattern into one or more waypoints that are understandable, to the application, as being associated with a zig-zag pattern, or radiator pattern.

The user device provides the flight information to the UAV. The user device provides sufficient information to the UAV to enable the UAV to perform the inspection. For instance, the user device can provide the safe altitude, the flight pattern, and so on. After receipt of the flight information, the user device can provide a request, or instruction, to the UAV to begin the inspection. That is, the user device can execute an application (e.g., an "app" downloaded from an application store, or otherwise installed on the user device that is in communication with the UAV.

Providing Track Path of Travel by Mobile Assets

In certain embodiments, the system may generate a path for a vehicle to travel along, or areas of a road network to avoid particular suspected road conditions, or physical road states that may be problematic. For example, if the system detects severe road conditions on a portion of the road network, the system may identify the area as a no travel zone. This area may be defined by a geo-spatial boundary where vehicles are prohibited from entering. This area or zone can be sent to the vehicles from the system, where the vehicle may have an inertial, or GPS-based navigation system. Or can be sent to particular users on a digital map, or report as described below. In the case of automated earth moving equipment, a path of travel may be provided to the system of the earth moving equipment. The path of travel would comprise geo-spatial coordinates for use by the particular vehicle. The prohibited zones may be provided to the vehicles so that the vehicles may calculate its own path of travel, and avoid the prohibited zones, where the prohibited zone has a road conditions that would inhibit efficiency travel of the vehicle, or where the prohibited zone has a road conditions where the road conditions would cause a safety issue for the particular type of vehicle if it were to travel over the road condition. In certain instance, a very large vehicle with wide and tall tires may be able to safely traverse a road condition. Whereas, with a smaller vehicle the small road condition may be problematic. Also, whether a vehicle is loaded or unloaded, and a particular weight of the vehicle may cause the road condition to be a hazard for the vehicle. A heavily weighted vehicle for example, may get stuck in a road condition such as a heavily rutted area.

LIDAR and Image Data Obtained by Vehicles

Figure 3:
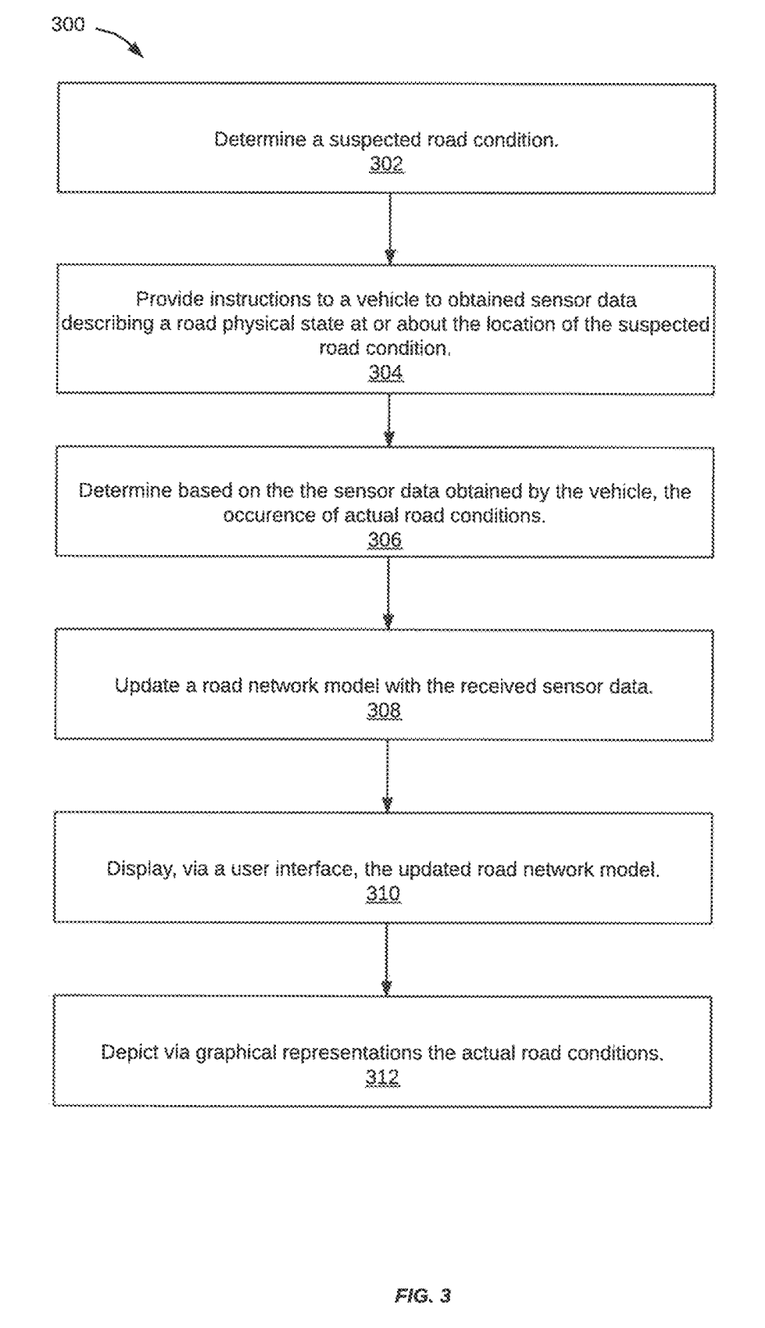
FIG. 3 illustrates a flow chart describing an exemplary process of the system.

Referring to FIG. 3, a process 300 of the system is depicted. In step 302, a suspected road condition is detected or determined as described herein. In step 304, instructions are provided to a vehicle to obtain sensor data describing a physical state of a road at or about the location of the suspected road condition. In step 306, the system determines based on the sensor data obtained by the vehicle, the occurrence of actual road conditions. In step 308, the system updates the road network model with the sensor data or information derived from the sensor data. In step 310, the system displays via a user interface and update road network model. The interface presents graphical representations of the actual road conditions determined to exist from the analysis of the obtained sensor data.

The system may transmit instructions to specific vehicles to activate onboard vehicle sensors while the vehicle maneuvers in a particular area to obtain sensor data describing physical road state of the location where the vehicle travels. For example, the system may transmit to onboard computer systems of the vehicle, commands or instructions to obtain additional sensor information when the vehicle is maneuvering around particular road segments, or when maneuvering around a particular geographic area (such as an area determined to be a suspected road condition). The system may transmit instructions or requests to particular vehicles. As discussed above, vehicles VEH123, VEH124, and VEH125 provide event history data to the system. These vehicles may be equipped with onboard computer systems, and wireless transceivers, or other transmission equipment, such as cellular or wifi transceivers. These vehicles receive the instructions to perform data collection at various locations. The system may send to a vehicle, a geo-spatial locations or geofences, where the geofence describes a real-word geographic boundary. The system may send to the vehicles road segment coordinates, or other location based description of road segments. This allows the system to selectively instruct the vehicles to obtain sensor data.

When a vehicle approaches, or enters into the geo-spatial location, the vehicle will activate data collection sensors, such a LIDAR and/or cameras. Or the vehicle approaches or enters the road segment geofence, then it would activate sensors to collect data. The LIDAR and/or cameras will obtain sensor and/or image data of the ground surface, around the vehicles.

Since storage space is limited, the sensors ideally would not be activated all of the time for a vehicle, but instead would be activated ideally or only when the vehicle is operating around or within the geospatial location.

Additionally, the vehicles will activate sensors to collection information describing the physical road state if the speed of the vehicle falls below a particular value. For example, if the vehicles speed drops below a certain value, the sensors will be activated. Or if the vehicles, brakes quickly, or if accelerometers on the vehicle indicate a quick deceleration, or if the suspension system of the vehicle indicates unusual suspension movement, then the LIDAR sensors of a vehicle may be activated. Additionally, the vehicles may be constrained to only active the sensors for the aforementioned activity, only if the vehicle is maneuvering or traversing in a defined geofence that was obtained by the vehicle from the system.

The obtained sensor data from the vehicles is obtained by the system, and used as described herein to determine and/or identify road conditions along the road network.

Additionally, the vehicle onboard system may be configured to trigger collection of data when a particular event of the vehicle occurs. For example, the vehicle onboard system may monitor for specific events, such as rotational slippage of the tire, acceleration/deceleration out of a nominal range, compression/extension of shocks out of a nominal range. When the vehicle detects the specified events, the vehicle may activate sensors to obtain data describing the physical state of the ground around the vehicle. Especially, in the case of autonomous vehicles, the system can be configure to perform a maneuvering pattern about a location, and obtain information about the ground.

User Interface Displaying Road Segments, and Road Conditions

Figure 4:
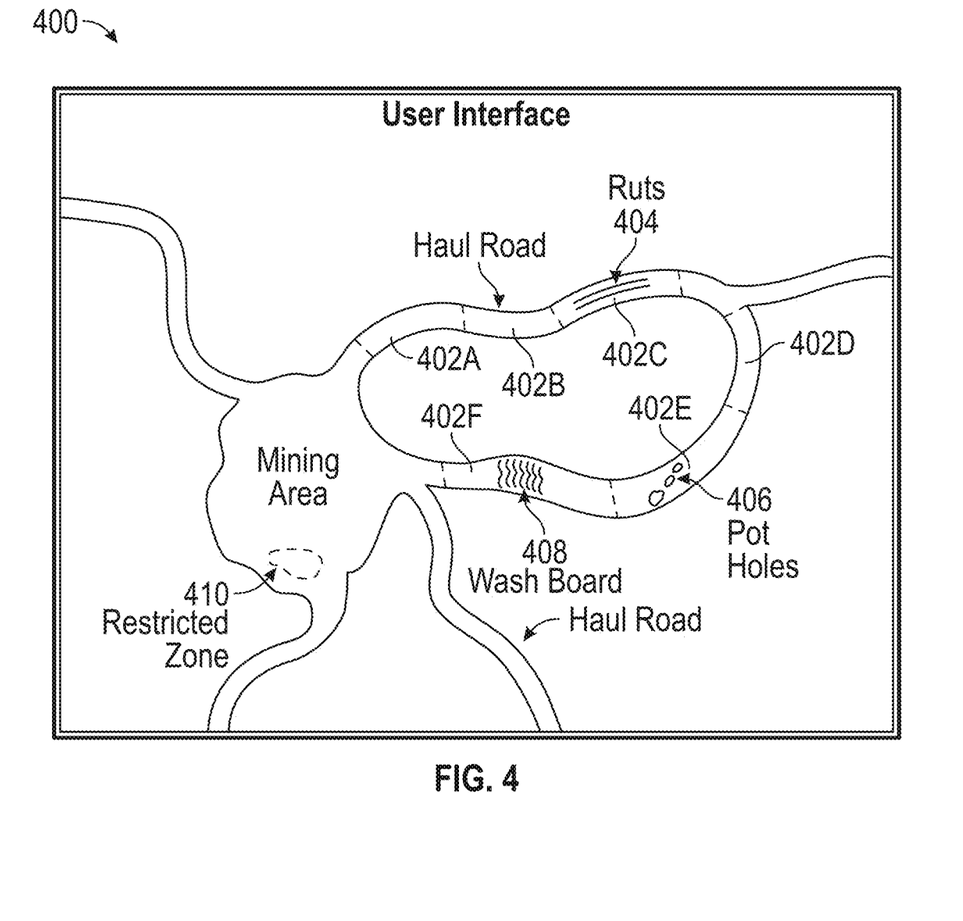
FIG. 4 illustrates an exemplary user interface of the system.

Referring to FIG. 4, an exemplary user interface 400 is shown. The user interface may be presented on a user device of a user, such as a laptop, tablet, mobile device, wearable device, display of a system, and so on. Optionally the user device, system, and so on, may receive touch-interactions and/or detect a pressure or force applied to a display of the user device, system, and so on. The user interface 400 may display a map, or ortho-rectified images, aerial images, or satellite images of the location of the road network. The ortho-rectified images for example, may have been taken by an Unmanned Aerial Vehicle (UAV) (e.g., the UAV may have navigated over an area capturing images), and the system may use a photogrammetry process to associate geospatial positions to various points about the image.

The user interface 400 of the system may display a map or other 3-dimensional representation of the road network, including the road segments 402A, 402B, 402C, 402D, 402E, 402F, graphical road conditions 404 ruts, 406 pot holes, and 408 washboarding, representations of the road condition models and/or road condition images. For the road segments the beginning and ending of a road segment may be represented by a dividing symbol such as a line or dashed line. Also, as discussed the road segment may also be displayed with other attributes such as color, or textual label, or other graphic symbols to indicate a score, rank or type of the road segment relative to the other road segments.

The system may use the imagery obtained by the UAV and/or the LIDAR data and imagery data obtained from the vehicles. The user interface may display a graphical road condition with a particular icon, color, shape or user affordance indicating the type of road condition. For example, a road condition of pot holes can be displayed with a circle or sphere representing the pot hole 406. The size of the displayed circle or sphere may be sized relative to the width or dimension of the pot hole. Wash boarding may be represented by consecutive wavy lines 408. Ruts may be represented by linear lines 404. The graphical road conditions presented via the user interface provide information information in a graphical manner as to the particular type of road condition. 410 depicts a restricted zone or where vehicles should not maneuver do to hazardous road conditions. As discussed herein, this geographic boundary may be provide directly to the onboard vehicle computer systems.

Although the user interface may present aerial imagery of a site and the imagery of the road network, the aerial imagery may be older, or outdated such that the imagery does not reflect a current state of the roads. By supplementing the imagery of the area with current road conditions, the system can augment the aerial imagery of the road and display updated sections of the road network without having to obtain completely new aerial images of the overall road network. This is particularly advantageous in that only small sections of the road network need to be updated with the identified road conditions as described herein. For example, a very large open pit mining area may have extensive space of operations. Receiving updated LIDAR data from vehicles or updated image data from a UAV for specific road segments or areas of the road segments allow the system to present current road conditions without having to obtain a completely new aerial survey of the complete mining area. The user interface may present an older imagery of the mining area and the road network, with areas or sections of the imagery or the road network supplemented with newer imagery or 3-dimensional structures that are more current than the original based imagery of the location.

Generating a Map Showing the Road Network

A digital map may be generated showing the road network with the existing road conditions. The digital map may be generated on a periodic basis, and sent to particular predetermined system users. For example, a site operator may receive the map or report of the road network conditions. This would allow the site operator to plan operations based on the received map. The digital map may be static, such as a report. Or may be interactive, where the digital map includes other information where an input received on the map would display additional data of information concerning a road condition at the selected point of interest.

Additionally, reports may be generated by the system to identify road segments where vehicles are not performing according to a desired operational criteria. The segments in the report can be color-coded, e.g., green/orange/red, and show graphical road conditions, and road condition images.

The processing of the system for determination and/or presentation of road conditions may generally be referred to as a road network vehicle optimization interface module.

Figure 5:
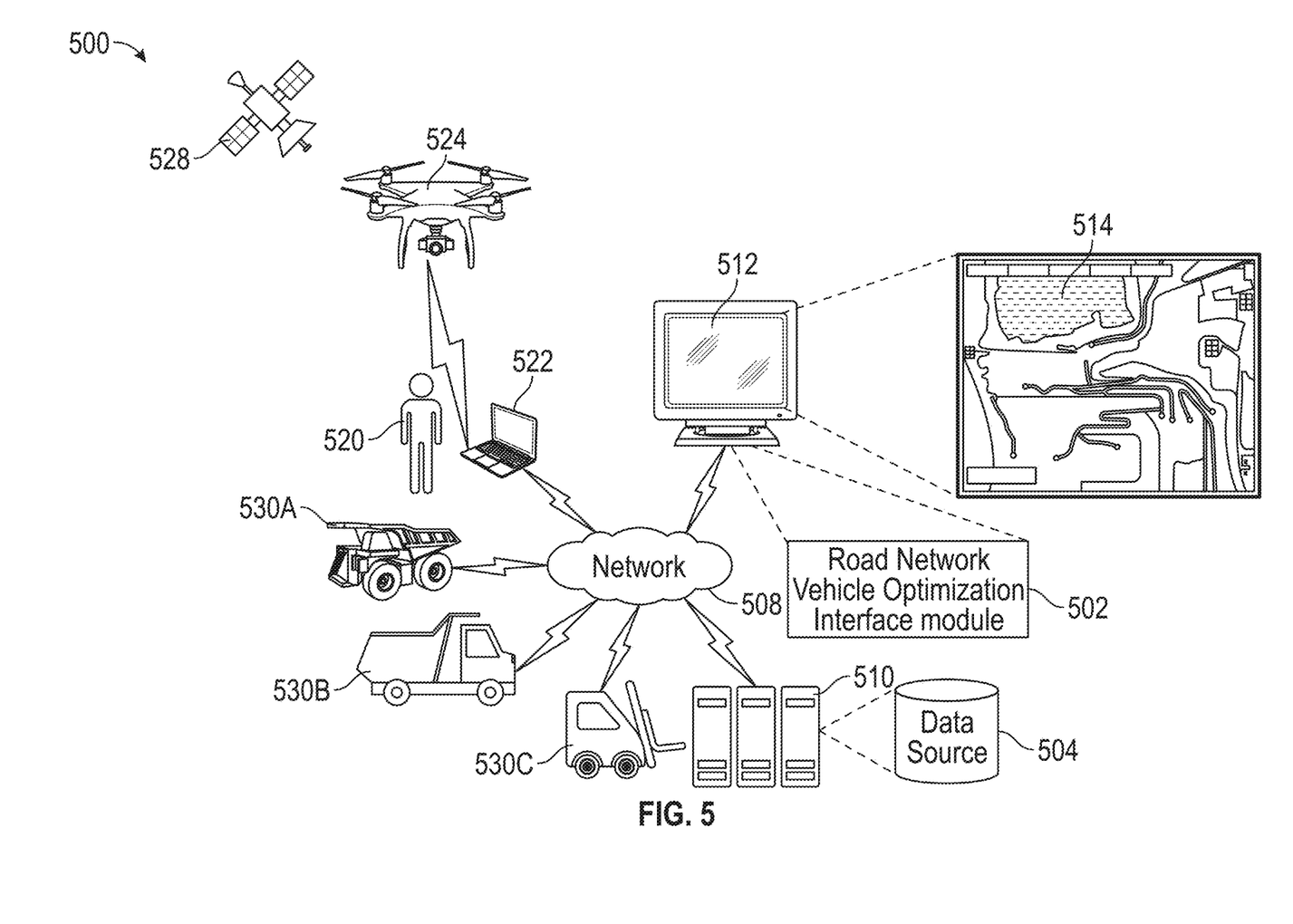
FIG. 5 illustrates an exemplary environment in which the user interface may be implemented.

FIG. 5 illustrates an example environment 500 in which a road network vehicle optimization interface module 502 as described herein may be implemented. Example environment 500 includes a data source, such as a database 504, which may be stored at a server system 510. A computing device 512 may access the data source 504 over a network 508. Network 508 is representative of, for example, the Internet. The computing device 512 presents an asset efficiency user interface module 514, which presents data from data source 504 in the user interface 514 via a graphical display. In an alternate implementation, the data source 504 may be stored locally, for example, on computing device, such as a laptop computer, mobile phone, or tablet device.

An operator 520 of a user device 522 may control an unmanned aerial vehicle (UAV) 524 to obtain aerial images of a suspected road condition. The unmanned aerial vehicle receives geo-spatial information from a satellite 528 (e.g., global navigation satellite system (GNSS) information). The UAV can utilize an onboard GNSS receiver, and obtain location information, such as ellipsoidal coordinates (latitude, longitude) in WGS84 reference system, along with altitudes of the UAV. The UAV can therefore obtain its three-dimensional location in space, and images may be associated by the UAV, or via later processing, of an image and the location of where the image was obtained.

Various mobile assets 530A, 530B, 530C, such as dump trucks, fork lifts, earth moving equipment, land-based drones, have onboard sensors. These sensors obtain event information regarding a state or some other operation of the asset. The assets obtain geo-spatial information from the satellite 528, and log the information into on-board storage of the vehicle. Additionally, the assets may use inertial navigation to obtain the position of the vehicle. The assets may be configured to wireless transmit the information, either in real-time, or read from the on-board storage, via a network 508, to later be stored in one or more systems 510, in a data storage 504.

While the computing system 512 is shown with the user interface. The mobile assets may have a display device where the user interface 514 is displayed. For example, a dump truck may have a monitor that displays the user interface 514. This allows the mobile asset to identify actual or suspected road conditions.

The system may be further configured to determine geographic areas where mobile asset inefficiencies are occurring. For example, using the aerial images obtained by a UAV, a digital surface model of an area may be generated. They system may analyze the event data for the mobile assets in comparison to 3-dimensional surface structures, and identify those structures via the user interface. For example, the system may determine that a geographic area exists where idleness for multiple vehicles is occurring. This can be done by analyzing the geo-spatial location of the mobile asset events, and the particular state and duration of the state. It may be found that vehicles are idling more often in a specific area than others. The system may compare the specific area with the digital surface model, and highlight or identify that a geo-graphic structure is causing the mobile assets to be idle. For example, using the aerial imagery the system can identify a narrow single-use road as the cause of where the vehicles are idling. For instance, vehicles have to wait for other vehicles to use the road. The system may suggest widening the road, or making modifications to other geo-graphic structures if they are at or near a location of where vehicles are determined to be idling.

Optionally, the system can utilize sensor information obtained from the vehicles, for example the system may correlate vehicle operational event at particular geographic areas with sensor information indicating a reduction in fuel efficiency of vehicles. The reduction can indicate that portions of the geographic area are causing difficulty for the vehicles, and therefore to improve efficiency the geographic area may be modified. The aerial images obtained by a UAV can be utilized to analyze the geographic area to determine a cause associated with the reduction.

Various types of UAVs may be used to implement one or more of the features described herein (for example, a fixed wing airplane, helicopter, a multi-rotor vehicle (e.g., a quad-copter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as LIDAR, and so on.

Of particular interest is the use of aerial images obtained by a UAV and using a software program to generate digital surface models, point clouds, or ortho-rectified images. For example, photogrammetry, simultaneous location and mapping (SLAM), and software such a Agisoft PhotoScan or Pix4Dmapper may be used to create a point cloud from the aerial images. An orthomosaic may include the obtained images, which have been combined or stitched together, and the orthomosaic may assign location information to points within the orthomosaic. The location information can be substantially accurate according to the accuracy of a ground control point marker, and GNSS, altitude sensors, readings as the UAV navigates about the geographic area.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments. It will be appreciated, however, that no matter how detailed the foregoing appears in text, the embodiments can be practiced in many ways. As is also stated above, it should be noted that the use of particular terminology when describing certain features, embodiments, and so on, should not be taken to imply that the terminology is being re-defined herein to be restricted to including any specific characteristics of the features, embodiments, and so on, with which that terminology is associated.

What is claimed is:

1. A computer-implemented method comprising:
obtaining aerial images representing real-world locations;
generating a road network based on the aerial images;
dividing the road network into one or more road segments;
determining a vehicle traversal criteria for each of the one or more road segments;
obtaining historical event information for one or more vehicles, wherein the one or more vehicles have traversed the one or more road segments, and the one or more vehicles have obtained operational data, the operational data comprising at least geo-spatial positions, time, and event data of respective ones of the one or more vehicles;
determining from the historical event information whether the one or more vehicles traversed the one or more road segments at a range or value other than the determined vehicle traversal criteria;
presenting, via a user interface, the one or more road segments; and
for a particular road segment of the one or more road segments, displaying, via the user interface, the road segment as a segment where vehicles have traversed the road segment at a range or value other than the determined vehicle traversal criteria.

2. The method of claim 1, further comprising:
determining the vehicle traversal criteria as a predetermined traversal time for a particular type of vehicle, each type of vehicle has a particular traversal time for a segment.

3. The method of claim 2, wherein the historical event information includes a unique identifier for each vehicle of the one or more vehicles.

4. The method of claim 1, wherein the historical event information for a vehicle includes one or more of the following: time of an event, geo-spatial location of the event, duration of the event, speed of the vehicle, fuel consumption of the vehicle, gear position of the vehicle, brake application, vehicle load information, shock absorber data, acceleration data, deceleration data.

5. The method of claim 1, further comprising:
determining the vehicle traversal criteria based on road geometry for a particular road segment.

6. The method of claim 5, wherein the road geometry for a particular road segment is defined by one or more parameters including: cross-falls, center line, superelevation, road width, grade, radius, switch backs, 2-ways, n-ways, or rimpull curves.

7. The method of claim 1, further comprising:
generating a flight plan for a UAV, the flight plan based upon an inspection area associated with a road segment or with a location of a determined road condition; and
providing the flight plan to the UAV or to a ground control station operable to control the UAV and perform the flight plan.

8. The method of claim 1, further comprising:
generating instructions for the one or more vehicles to obtain sensor data describing actual physical road conditions;
transmitting the instructions to the one or more vehicles;
receiving sensor data obtained from the one or more vehicles, wherein the sensor data is digital images, or LIDAR data; and
updating portions of the road network from the received sensor data.

9. The method of claim 1, further comprising:
training a visual classifier with a data set of images of actual physical road conditions;
receiving images different from the data set of images, wherein the different images depict a portion of a road associated with a road network; and
identifying, with the visual classifier, a type of road condition found in the different images, wherein the type of road condition is at least one of: pot holes, wash boarding, ruts, ditches, alligator cracking, block cracking, transverse cracking, edge cracks, joint reflection cracks, slippage cracks, depressions, shoving, upheaval, raveling, water pooling, snow, large rocks, obstacles, erosion, plant or foliage overgrowth, uneven surfaces, or protrusions.

10. A system, comprising:
one or more computer processors; and
a non-transitory storage device storing instructions operable to cause the one or more computer processors to perform operations comprising:
obtaining aerial images representing real-world locations;
generating a road network based on the aerial images;
dividing the road network into one or more road segments;
determining a vehicle traversal criteria for each of the one or more road segments;
obtaining historical event information for one or more vehicles;
determining from the historical event information whether the one or more vehicles traversed the one or more road segments at a range or value other than the determined vehicle traversal criteria;
presenting, via a user interface, the one or more road segments; and
for a particular road segment of the one or more road segments, displaying via the user interface, the road segment as a segment where vehicles have traversed the road segment at a range or value other than the determined vehicle traversal criteria.

11. The system of claim 10, the operations further comprising:
determining the vehicle traversal criteria as a predetermined traversal time for a particular type of vehicle, each type of vehicle has a particular traversal time for a segment.

12. The system of claim 11, wherein the historical event information includes a unique identifier for each vehicle of the one or more vehicles.

13. The system of claim 10, wherein the historical event information for a vehicle includes one or more of the following: time of an event, geo-spatial location of the event, duration of the event, speed of the vehicle, fuel consumption of the vehicle, gear position of the vehicle, brake application, vehicle load information, shock absorber data, acceleration data, or deceleration data.

14. The system of claim 10, the operations further comprising:
determining the vehicle traversal criteria based on road geometry for a particular road segment.

15. The system of claim 14, wherein the road geometry for a particular road segment is defined by one or more parameters including: cross-falls, center line, superelevation, road width, grade, radius, switch backs, 2-ways, n-ways, or rimpull curves.

16. The system of claim 10, the operations further comprising:
  generating a flight plan for a UAV, the flight plan based upon an inspection area associated with a road segment or with a location of a determined road condition; and
  providing the flight plan to the UAV or to a ground control station operable to control the UAV and perform the flight plan.

17. The system of claim 10, the operations further comprising:
  generating instructions for the one or more vehicles to obtain sensor data describing actual physical road conditions;
  transmitting the instructions to the one or more vehicles;
  receiving sensor data obtained from the one or more vehicles, wherein the sensor data is digital images, or LIDAR data; and
  updating portions of the road network from the received sensor data.

18. The system of claim 10, the operations further comprising:
  training a visual classifier with a data set of images of actual physical road conditions;
  receiving images different from the data set of images, wherein the different images depict a portion of a road associated with a road network; and
  identifying with the visual classifier, a type of road condition found in the different images, wherein the type of road condition is at least one of: pot holes, wash boarding, ruts, ditches, alligator cracking, block cracking, transverse cracking, edge cracks, joint reflection cracks, slippage cracks, depressions, shoving, upheaval, raveling, water pooling, snow, large rocks, obstacles, erosion, plant or foliage overgrowth, uneven surfaces, or protrusions.

19. A non-transitory storage device storing instructions operable to cause one or more computer processors to perform operations comprising:
  obtaining aerial images representing real-world locations;
  generating a road network based on the aerial images;
  dividing the road network into one or more road segments;
  determining a vehicle traversal criteria for each of the one or more road segments;
  obtaining historical event information for one or more vehicles, wherein the one or more vehicles have traversed the one or more road segments, and the one or more vehicles have obtained operational data, the operational data comprising at least geo-spatial positions, time, and event data of respective ones of the one or more vehicles;
  determining from the historical event information whether the vehicles traversed the one or more road segments at a range or value other than the determined vehicle traversal criteria;
  presenting, via a user interface, the one or more road segments; and
  for a particular road segment of the one or more road segments, displaying via the user interface, the road segment as a segment where vehicles have traversed the road segment at a range or value other than the determined vehicle traversal criteria.

20. The non-transitory storage device of claim 19, the operations further comprising:
  determining the vehicle traversal criteria as a predetermined traversal time for a particular type of vehicle, each type of vehicle has a particular traversal time for a segment.

21. The non-transitory storage device of claim 20, wherein the historical event information includes a unique identifier for each vehicle of the one or more vehicles.

22. The non-transitory storage device of claim 19, wherein the historical event information for a vehicle includes one or more of the following: time of an event, geo-spatial location of the event, duration of the event, speed of the vehicle, fuel consumption of the vehicle, gear position of the vehicle, brake application, vehicle load information, shock absorber data, acceleration data, or deceleration data.

23. The non-transitory storage device of claim 19, the operations further comprising:
  determining the vehicle traversal criteria based on road geometry for a particular road segment.

24. The non-transitory storage device of claim 23, wherein the road geometry for a particular road segment is defined by one or more parameters including: cross-falls, center line, superelevation, road width, grade, radius, switch backs, 2-ways, n-ways, or rimpull curves.

25. The non-transitory storage device of claim 19, the operations further comprising:
  generating a flight plan for a UA V, the flight plan based upon an inspection area associated with a road segment or with a location of a determined road condition; and
  providing the flight plan to the UA V or to a ground control station operable to control the UAV and perform the flight plan.

26. The non-transitory storage device of claim 19, the operations further comprising:
  generating instructions for the one or more vehicles to obtain sensor data describing actual physical road conditions;
  transmitting the instructions to the one or more vehicles;
  receiving sensor data obtained from the one or more vehicles, wherein the sensor data is digital images, or LIDAR data; and
  updating portions of the road network from the received sensor data.

27. The non-transitory storage device of claim 19, the operations further comprising:
  training a visual classifier with a data set of images of actual physical road conditions;
  receiving images different from the data set of images, wherein the images depict a portion of a road; and
  identifying with the visual classifier, a type of road condition found in the different images, wherein the road condition is at least one of: pot holes, wash boarding, ruts, ditches, alligator cracking, block cracking, transverse cracking, edge cracks, joint reflection cracks, slippage cracks, depressions, shoving, upheaval, raveling, water pooling, snow, large rocks, obstacles, erosion, plant or foliage overgrowth, uneven surfaces, or protrusions.

* * * * *